United States Patent
Saund et al.

(10) Patent No.: US 8,848,577 B2
(45) Date of Patent: Sep. 30, 2014

(54) BANDWIDTH MANAGEMENT

(71) Applicants: Gurjeet S. Saund, Saratogo, CA (US);
James B. Keller, Redwood City, CA
(US); Manu Gulati, Saratoga, CA (US);
Sukalpa Biswas, Fremont, CA (US)

(72) Inventors: Gurjeet S. Saund, Saratogo, CA (US);
James B. Keller, Redwood City, CA
(US); Manu Gulati, Saratoga, CA (US);
Sukalpa Biswas, Fremont, CA (US)

(73) Assignee: Apple Inc., Cupertino, CA (US)

( * ) Notice: Subject to any disclaimer, the term of this patent is extended or adjusted under 35 U.S.C. 154(b) by 144 days.

(21) Appl. No.: 13/625,416

(22) Filed: Sep. 24, 2012

(65) Prior Publication Data

US 2014/0086070 A1    Mar. 27, 2014

(51) Int. Cl.
*H04L 12/28* (2006.01)

(52) U.S. Cl.
USPC .......................... 370/254; 370/255; 370/235

(58) Field of Classification Search
None
See application file for complete search history.

(56) References Cited

U.S. PATENT DOCUMENTS

| | | | |
|---|---|---|---|
| 6,871,161 B2 | 3/2005 | Laird | |
| 7,243,041 B2 | 7/2007 | Nalawadi et al. | |
| 7,483,390 B2 * | 1/2009 | Rover et al. | 370/254 |
| 8,078,778 B2 | 12/2011 | Fuji | |
| 8,493,863 B2 * | 7/2013 | Saund et al. | 370/235 |
| 8,649,286 B2 * | 2/2014 | Saund et al. | 370/252 |
| 2007/0140030 A1 | 6/2007 | Wyatt | |
| 2010/0169585 A1 | 7/2010 | Steinbrecher et al. | |
| 2011/0314231 A1 | 12/2011 | O'Connor | |
| 2012/0030434 A1 | 2/2012 | Nickel et al. | |
| 2012/0182888 A1 * | 7/2012 | Saund | 370/252 |
| 2012/0182889 A1 * | 7/2012 | Saund et al. | 370/252 |
| 2012/0182902 A1 * | 7/2012 | Saund et al. | 370/254 |
| 2012/0185062 A1 * | 7/2012 | Saund et al. | 700/11 |
| 2014/0086070 A1 * | 3/2014 | Saund et al. | 370/252 |

FOREIGN PATENT DOCUMENTS

| | | |
|---|---|---|
| EP | 1403773 | 3/2004 |
| EP | 2477119 | 11/2012 |
| GB | 2447688 | 9/2008 |
| WO | 2006035344 | 4/2006 |

OTHER PUBLICATIONS

International Search Report and Written Opinion from PCT/US2013/060528, mailed Nov. 29, 2013, Apple Inc., pp. 1-9.

\* cited by examiner

*Primary Examiner* — Robert Wilson

(74) *Attorney, Agent, or Firm* — Lawrence J. Merkel; Meyertons, Hood, Kivlin, Kowert & Goetzel P.C.

(57) ABSTRACT

In some embodiments, a system includes a shared, high bandwidth resource (e.g. a memory system), multiple agents configured to communicate with the shared resource, and a communication fabric coupling the multiple agents to the shared resource. The communication fabric may be equipped with limiters configured to limit bandwidth from the various agents based on one or more performance metrics measured with respect to the shared, high bandwidth resource. For example, the performance metrics may include one or more of latency, number of outstanding transactions, resource utilization, etc. The limiters may dynamically modify their limit configurations based on the performance metrics. In an embodiment, the system may include multiple thresholds for the performance metrics, and exceeding a given threshold may include modifying the limiters in the communication fabric. There may be hysteresis implemented in the system as well in some embodiments, to reduce the frequency of transitions between configurations.

20 Claims, 4 Drawing Sheets

| Agent/Attribute | Level 1 | Level 2 | Level 3 | Level 4 |
|---|---|---|---|---|
| GPU/Bulk | 16 | 8 | 1 | 0.5 |
| GPU/LLT | 0.1 | 0.1 | 0.1 | 0.1 |
| Processor | 4 | 4 | 1 | 0.5 |
| Real Time | 8 | 8 | 8 | 6 |

BANDWIDTH MANAGEMENT

BACKGROUND

This application may be related to the following U.S. Patent Applications: U.S. patent application Ser. No. 13/008,171, now U.S. Pat. No. 8,744,602; U.S. patent application Ser. No. 13/008,156; U.S. patent application Ser. No. 13/008,180, now U.S. Pat. No. 8,649,286; and U.S. patent application Ser. No. 13/008,184, now U.S. Pat. No. 8,493,863. The above applications discuss various limiter circuits.

FIELD OF THE INVENTION

This invention is related to electronic systems, and particularly portable electronic systems and providing bandwidth from a resource in such systems.

DESCRIPTION OF THE RELATED ART

The computing power and advanced functionality of portable electronic devices continues to increase, enabling tremendous user experiences not previously associated with such devices. Features becoming common in portable electronic devices include streaming high resolution video (e.g. high definition (HD) video), advanced graphics rendering in both 2 dimensional (2D) and 3D spaces, high speed wireless networking for Internet browsing and other online communication, advanced gaming and productivity applications, photo and video editing and capture, multiprocessing, etc. Portable electronic devices include various devices that are designed to run for long periods of time (e.g. hours) on battery power. Examples of portable electronic devices include smart phones, personal digital assistants, tablet computing devices such as the iPad®, laptops and net-tops, etc.

As the features of portable electronic devices become more advanced, a complex tradeoff between performance and power consumption is required. Power consumption both affects battery life and also presents thermal challenges related to removing heat from relatively small devices. Particularly, the tradeoffs related to access by a number of demanding components to a shared resource such as a main memory system become problematic. The demanding components may include, e.g., graphics processing units (GPUs), other processors such as central processing units (CPUs) and various microcontrollers and other embedded processors, display controllers displaying high definition images on the display screen of the devices, etc. In order to support high performance, a high bandwidth memory system is desired. However, the power consumed in a heavily utilized, high bandwidth memory system often generates significant thermal and battery life challenges. Additionally, even performance can be impacted in a high bandwidth system. For example, average memory latency may increase as multiple high bandwidth components compete for memory access. High bandwidth components can also dominate memory bandwidth, preventing lower bandwidth components from obtaining sufficient access.

SUMMARY

In some embodiments, a system includes a shared, high bandwidth resource (e.g. a memory system), multiple agents configured to communicate with the shared resource, and a communication fabric coupling the multiple agents to the shared resource. The communication fabric may be equipped with limiters configured to limit bandwidth from the various agents based on one or more performance metrics measured with respect to the shared, high bandwidth resource. For example, the performance metrics may include one or more of latency, number of outstanding transactions, resource utilization, etc. The limiters may dynamically modify their limit configurations based on the performance metrics, permitting flexibility in access to the shared, high bandwidth resource while mitigating performance and/or power impacts. For example, the configuration may permit transient peaks in bandwidth followed by periods of reduced bandwidth, allowing a temporary high bandwidth need to be served while limiting the thermal/power impact as well as the performance impact to other agents.

In an embodiment, the system may include multiple thresholds for the performance metrics, and exceeding a given threshold may cause the dynamic modification of the limiters in the communication fabric. There may be hysteresis implemented in the system as well in some embodiments, to reduce the frequency of transitions between configurations.

BRIEF DESCRIPTION OF THE DRAWINGS

The following detailed description makes reference to the accompanying drawings, which are now briefly described.

Figure 1:
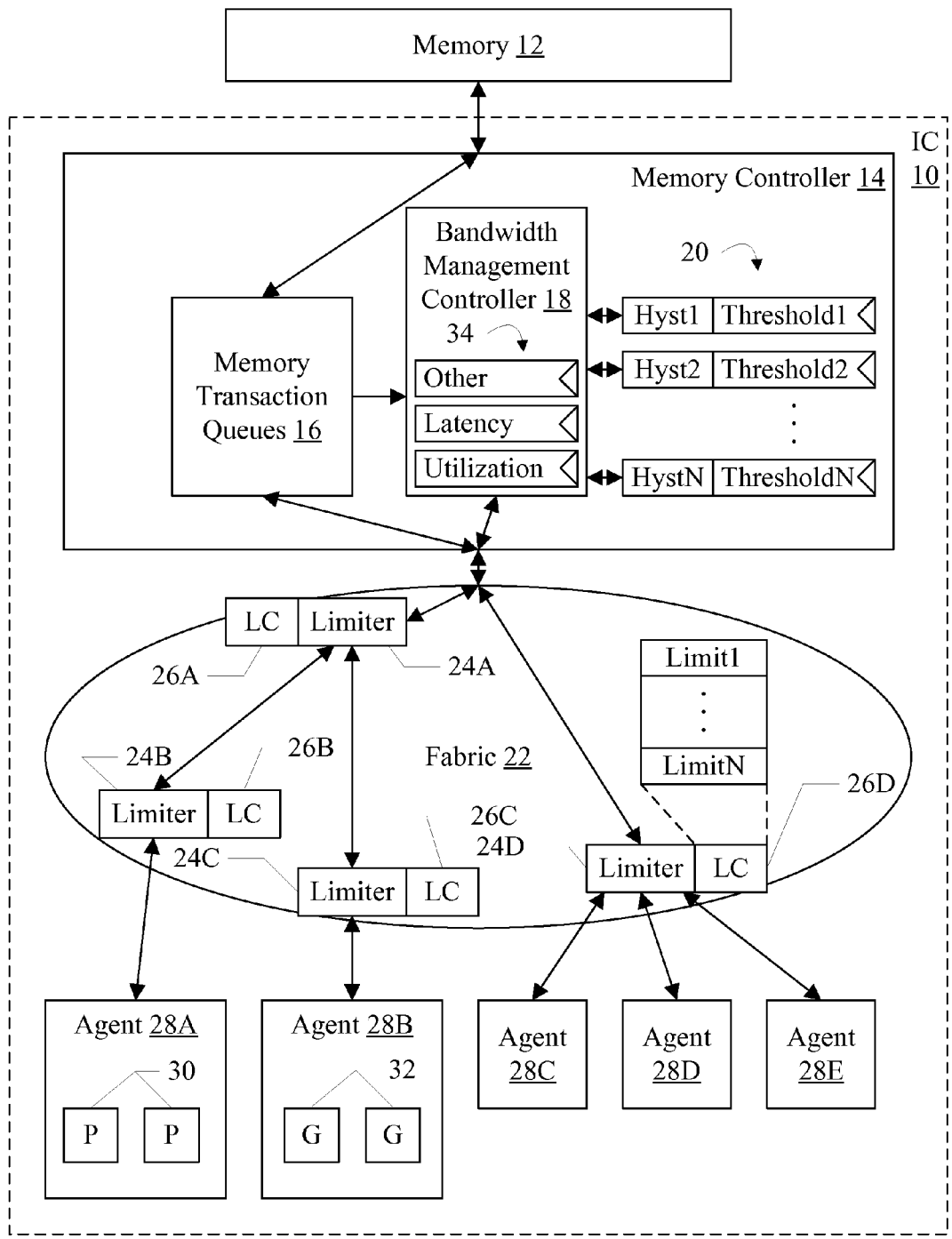
FIG. 1 is a block diagram of one embodiment of an integrated circuit and an external memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of an integrated circuit (IC) 10 and a memory 12 coupled to the IC 10 is shown. More particularly, the IC 10 may include a memory controller 14 coupled to the memory 12. The memory controller 14 may include one or more transaction queues and/or other buffers 16, a bandwidth management controller 18, and a set of threshold registers 20. The bandwidth management controller 18 is coupled to the threshold registers 20 and the memory transaction queues 16. The memory transaction queues 16 may be coupled to receive memory transactions from a communication fabric 22 (or, more briefly, the fabric 22), and to transmit memory transactions to the memory 12. The bandwidth management controller 18 may also be coupled to the fabric 22 to communicate indications of threshold levels, as discussed in more detail below. The fabric 22 includes various limiter circuits (or, more briefly, limiters) such as limiters 24A-24D in FIG. 1. Each limiter 24A-24D may be coupled to/include a limiter configuration table (LC) 26A-26D. The fabric 22 is coupled to various agents such as agents 28A-28E in FIG. 1. In the illustrated embodiment, the agent 28A may be a CPU agent including one or more processors 30, and the agent 28B may be a GPU agent including one or more GPUs 32.

The bandwidth management controller 18 may be configured to monitor the memory traffic (e.g. the memory transactions) and accumulate one or more performance metrics for the memory system. Based on the performance metrics, the bandwidth management controller 18 may be configured to communicate information to the fabric 22, which may be configured to dynamically adjust one or more fabric characteristics. The adjusted characteristics may improve performance and/or reduce power consumption in the memory system in view of the performance metrics detected by the bandwidth management controller 18.

The performance metrics may be accumulated by the bandwidth management controller 18 in various registers 34 (or other clocked storage devices, in various embodiments). The accumulated performance metrics in the registers 34 may be compared to thresholds programmed in the registers 20 to determine which of the thresholds have been exceeded by the metrics, if any. The bandwidth management controller 18 may be configured to broadcast indications of the thresholds that have been exceeded (e.g. a threshold level for each metric, where the level indicates which thresholds have been exceeded). Accordingly, there may be thresholds in the registers 20 for each metric that is implemented by the bandwidth management controller 18. There may be at least one threshold per metric, and there may be more than one threshold per metric, in various embodiments.

In some embodiments, the bandwidth management controller 18 may implement hysteresis in the threshold measurements (illustrated as a "Hyst" value in each of the registers 20 in FIG. 1). The hysteresis may reduce the frequency of threshold level changes, slowing the rate at which the IC 10 reacts to changes in the performance metrics. Such slowing may be desired, in some cases, because the disruption of changing the fabric characteristics may be less frequent, for example. Additionally, the hysteresis may permit the memory system to operate at high bandwidth levels for relatively short periods of time, while limiting the longer-term operation to lower bandwidth levels to provide more manageable thermal properties and/or power consumption.

The hysteresis may be measured in any desired fashion. For example, the hysteresis may be an offset from the corresponding threshold, and the metric may need to drop below the threshold by the offset amount after then threshold has been exceeded before the bandwidth management controller 18 transitions back to the lower threshold level. Alternatively, the hysteresis may be a percentage of the threshold value or may be programmed as a second threshold value below the threshold value. The hysteresis may also be measured as an amount of time that the corresponding metric is required to exceed the threshold before the bandwidth management controller 18 determines that the threshold has been exceeded and/or an amount of time that the metric is required to be below the threshold before the bandwidth management controller 18 determines that the threshold is no longer exceeded.

The performance metrics accumulated by the bandwidth management controller 18 may be any metrics that quantify aspects of the memory traffic over a period of time. For example, performance metrics may include one or more of: average memory latency of memory transactions, utilization of the memory bandwidth, fullness of queues (or "queue depth") in the memory system such as the memory transaction queues 16, transaction counts, data/statistics provided by requesting agents and/or firmware executable on an embedded processor/microcontroller (not shown) that indicates performance, etc.

The memory latency may be the amount of time elapsing between two defined points in the progress of the memory transaction. For example, the memory latency may be defined as the time elapsing between issuance of the memory transaction by an agent 28A-28E to the return of data for the transaction to the agent 28A-28E (for a read) or the committal of data to the memory 12 (for a write). Alternatively, other points may be used (e.g. the arrival of the memory transaction in the memory controller 14 and the transmission of data from the memory controller 14 for a read or the committal of data to the memory 12 for a write). The average memory latency may then be the average of the latencies of memory transactions over a period of time.

The memory bandwidth utilization may be the percentage of available bandwidth to the memory 12 (over a period of time) that is utilized to exchange data. The higher the utilization, the more power is being consumed in the memory 12. Similarly, other performance impacts may be occurring with higher utilization. For example, a high bandwidth agent 28A-28E may be dominating the memory traffic, preventing other agents 28A-28E from achieving sufficient amounts of bandwidth. Additionally, higher bandwidth utilization may be associated with adverse affects on latency-sensitive agents. Accordingly, modifying the fabric characteristics based on the utilization may be desirable. Similarly, queue depth and transaction counts may be measures that are indicative of memory system performance and may be used to modify fabric characteristics.

The fabric characteristics may generally be any configurable parameters of the fabric 22 that affect the transmission of transactions through the fabric 22, and thus affect the bandwidth demands made on the memory system. For example, fabric characteristics may include the clock frequency of the fabric, the width of the fabric (e.g. the number of data bits/bytes transmitted in parallel), the effective depth of various queues/buffers in the fabric (not shown in FIG. 1), transaction count limits, transaction rate limits, distribution of bandwidth among the agents, the mean/maximum latency experienced by agents, etc. The fabric characteristics may be directly modifiable as parameters, or may be indirectly controlled by changing other parameters in the fabric.

In the illustrated embodiment, various limiters 24A-24D may be the mechanism for modifying the characteristics of the fabric 22. Other embodiments may implement other mechanisms (e.g. modifying the clock frequency of clocks used in the fabric 22, modifying the width of data transfers, reducing the rate of data transfers, etc.). The limiters 24A-24D may be circuits included at various points within the fabric 22 and may be configured to limit the memory transactions flowing through the fabric 22 at that point. For example, in the embodiment of FIG. 1, the limiter 24B may limit transactions issued by the agent 28A, the limiter 24C may limit transactions issued by the agent 28B, and the limiter 24D may limit transactions issued by the agents 28C, 28D, and 28E (in aggregate). The limiters may also be hierarchical (e.g. the limiter 24A may further limit transactions from the limiters 24B-24C). In the hierarchical case, the limiters in the hierarchy may apply different limits (e.g. transaction limits followed by rate limits). Alternatively, the levels in the hierarchy may apply the same limits. When a limiter is coupled to receive transactions from more than one source (e.g. the limiter 24D receiving transactions from the agents 28C-28E), the limits may be enforced across the agents as a whole (e.g. there may be one limit that applies to the aggregate of transactions issued from the agents 28C-28E). Alternatively, each agent may be assured of a portion of the limit and the remainder of the limit may be shared. Transactions from each agent 28A-28E may thus flow through at least one limiter 24A-24D and may flow through multiple limiters. Various embodiments may employ any number of limiters, and any configuration of the limiters.

There may be a variety of limiters. For example, transaction limiting may limit the number of transactions that are permitted to be outstanding at a given point in time. Once the transaction limit is reached, another transaction is not issued until one of the outstanding transactions completes. Another type of limit may be rate limiting. With rate limiting, the number of transactions issued over a period of time may be limited to a maximum. For example, a minimum delay between transactions may be inserted by a rate limiter. Alternatively, the rate limiter may have a number of credits to issue over a given window of time, and the rate limiter may prevent additional transaction issuance in the window once the credits have been exhausted. At the end of the window, the credits may be refilled for the next window. In another example, the limiters may include buffers for transactions, and may modify the depth of the buffers to limit transaction flow. Any set of limiters may be implemented in various embodiments. The limiters may have hierarchical, non-hierarchical, or partially hierarchical arrangements.

In some embodiments, the limiters 24A-24D may by implemented on a transaction type, transaction attribute, or virtual channel basis as well. That is, the limiters may implement different limits for different transaction types, different transaction attributes, or different virtual channels. In one implementation, a quality of service (QoS) attribute may be assigned to each transaction and limiters may operate on a QoS basis.

As mentioned previously, each limiter 24A-24D may have an associated limit configuration table 26A-26D. The LC tables 26A-26D may be programmable with the limits to enforce when the bandwidth management controller 18 indicates that a corresponding threshold has been exceeded. The LC table 26D is shown in exploded view in FIG. 1, and have an entry corresponding to each threshold level (e.g. limit) to limit N corresponding to threshold) to thresholdN in the registers 20, respectively). The LC tables 26A-26D may be formed from any storage circuitry (e.g. flops, registers, memory array, etc.).

The fabric 22 may be any communication fabric. Generally, a communication fabric may include the interconnect (e.g. transmission media) over which transactions are transmitted and the protocol defining how the transactions are transmitted. The communication fabric may also include circuitry between the source of a transaction and the destination, in some cases. Various forms of communication fabric may include shared buses, point-to-point interconnect, packet-based communication, hierarchical interconnect, etc.

A memory transaction may generally be any communication that causes a movement of data to or from memory. Read memory transactions may cause a movement of data from memory to the source agent of the transaction, and write memory transactions may cause a movement of data from the source agent to memory.

An agent may generally include any circuitry configured to communicate on the fabric 22. For example, the agent 28A includes processors 30, which may generate memory transactions to fetch instructions for execution and/or to read and write data manipulated by the processors 30 in response to instruction execution. The agent 28A may also include other circuitry (e.g. one or more levels of cache below the processor's caches, an interface unit for the fabric 22, etc.). Similarly, the agent 28B may include the GPUs 32, which may generate memory transactions to fetch instructions for execution and/or to read and write data representing graphical objects. The agent 28B may also include other circuitry, such as the caches and interface unit mentioned above for the agent 28A. The agents 28C-28E may be various other types of agents (e.g. peripheral components, peripheral interface controllers, direct memory access (DMA) controllers, etc.).

In the embodiment of FIG. 1, the bandwidth management controller 18 is included in the memory controller 14. In other embodiments, the bandwidth management controller 18 may be located elsewhere. Additionally, in some embodiments, the circuitry forming the bandwidth controller may be distributed over the IC 10. It is also noted that, while registers 20 are programmed with the threshold and hysteresis values in this embodiment, other embodiments may use other storage for the tables of thresholds and/or hysteresis. For example, other clocked storage devices (latches, flops, etc.) or a memory array may be used.

While the embodiment of FIG. 1 manages the memory bandwidth in the memory system (e.g. the memory controller 14 and the memory 12), other embodiments may manage the bandwidth of any shared resource. Generally, a shared resource may be any resource that is used by two or more agents 28A-28E concurrently. A resource, in this context, may be any circuitry configured to provide data or receive data. For example, a resource may be a memory, any other volatile or non-volatile storage device, a peripheral interface controller configured to communicate on a peripheral interface, a peripheral component, etc.

Figure 2:
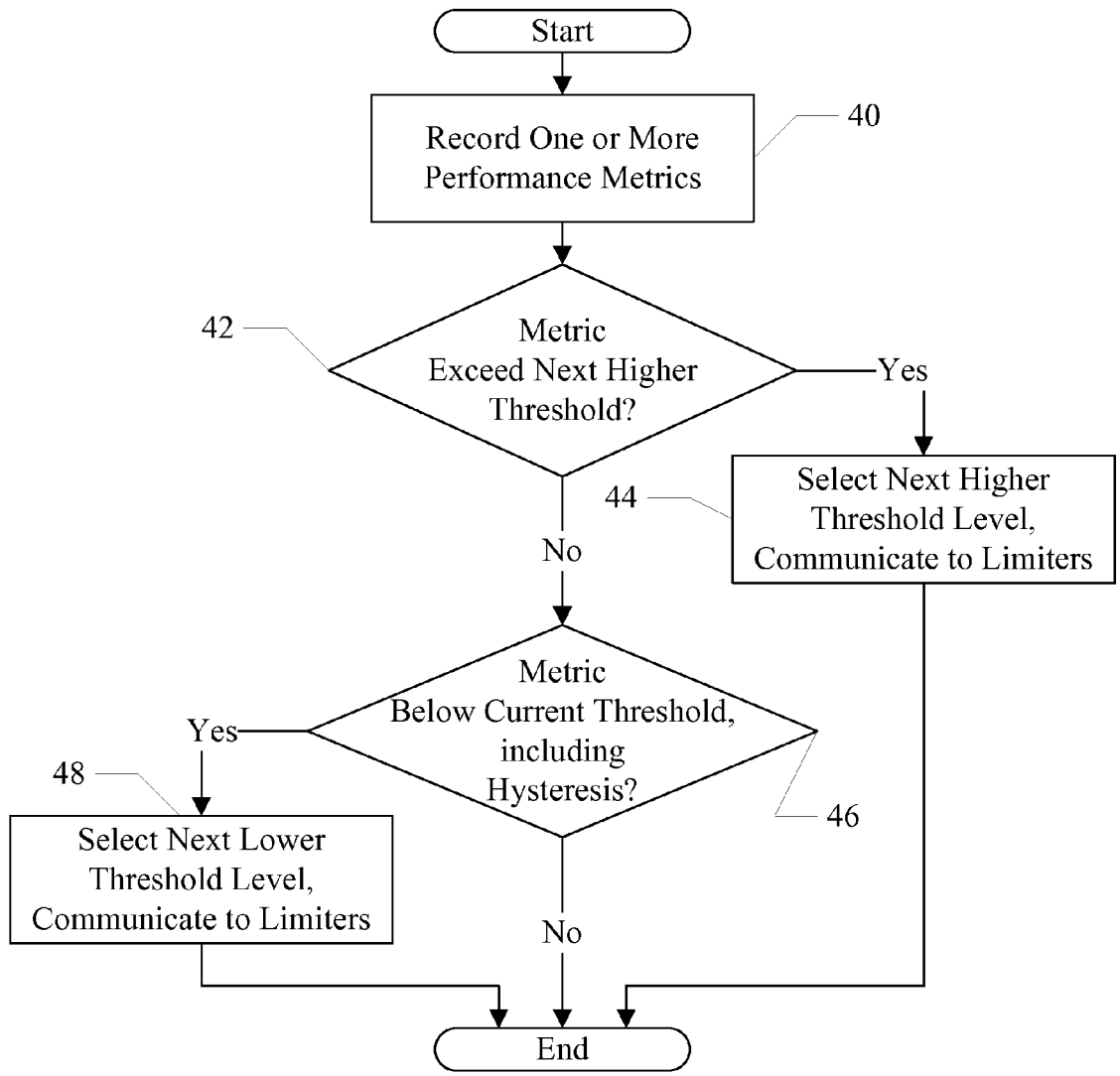
FIG. 2 is a flowchart illustrating operation of one embodiment of a bandwidth management controller shown in FIG. 1.

Turning now to FIG. 2, a flowchart is shown illustrating operation of one embodiment of the bandwidth management controller 18. While the blocks are shown in a particular order for ease of understanding, other orders may be used. Blocks may be performed in parallel by combinatorial logic in the bandwidth management controller 18. Blocks, combinations of blocks, and/or the flowchart as a whole may be pipelined over multiple clock cycles. The bandwidth management controller 18 may be configured to implement the operation shown in FIG. 2.

The bandwidth management controller 18 may be configured to record one or more performance metrics (block 40). Each performance metric may be associated with a current threshold level, which may be the most recent threshold level communicated to the limiters 24A-24D. That is, the limiters 24A-24D may currently be enforcing limits corresponding to the current threshold level. The current threshold level may be less than the lowest of the thresholds, between any two thresholds, or above the highest threshold. If at least one of the performance metrics exceeds the next higher threshold level (as compared to the current threshold level) (decision block 42, "yes" leg), the bandwidth management controller 18 may be configured to select the next higher threshold and communicate the selected threshold level to the limiters (block 44). The communication may be performed in any fashion. For example, the bandwidth management controller 18 may be configured to directly signal the limiters, or may be configured to transmit a communication over the fabric 22. On the other hand, if the performance metric has fallen below the next lower threshold, including taking into account the hysteresis (decision block 46, "yes" leg), the bandwidth management controller 18 may be configured to select the next lower threshold level and communicate the selected level to the limiters (block 48).

Figure 3:
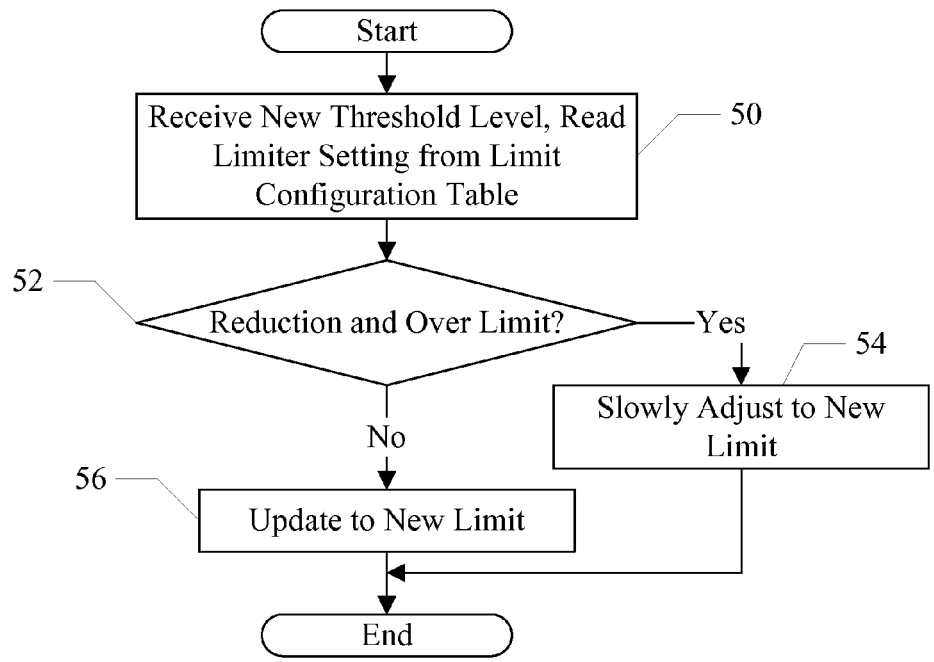
FIG. 3 is a flowchart illustrating operation of one embodiment of the limiters shown in FIG. 1.

Turning next to FIG. 3, a flowchart is shown illustrating operation of one embodiment of the limiters 24A-24D in response to a new threshold level. While the blocks are shown in a particular order for ease of understanding, other orders may be used. Blocks may be performed in parallel by combinatorial logic in the limiters 24A-24D. Blocks, combinations of blocks, and/or the flowchart as a whole may be pipelined over multiple clock cycles. The limiters 24A-24D may be configured to implement the operation shown in FIG. 3. Each limiter 24A-24D may independently implement the operation.

The limiter 24A-24D may be configured to receive an indication of the new threshold level from the bandwidth management controller 18, and may be configured to read a corresponding limiter setting from the corresponding limiter configuration table 26A-26D (block 50). The indication may be an index into the corresponding limiter configuration table. The limiter 24A-24D may be configured to dynamically update the current limit to the limit read from the limit configuration table 26A-26D. In some embodiments, if the new limit is a reduction from the current limit and the current state of the transactions is over the new limit (decision block 52, "yes" leg), the limiter 24A-24D may be configured to slowly reduce the limit to the new limit (block 54). That is, rather than immediately adjusting to the new limit (and potentially causing a discontinuity in the transmission of transactions while the outstanding transactions wait to fall below the new limit), the limiter 24A-24D may permit some transaction issuance as the limiter 24A-24D transitions to the new limit. If the new limit is not a reduction or the current state is not over the new limit (decision block 52, "no" leg), the limiter 24A-24D may transition to the new limit (block 56). In other embodiments, the limiter may transition directly to the new limit even in the case that the new limit is a reduction and the current transaction state is over the limit.

Figure 4:
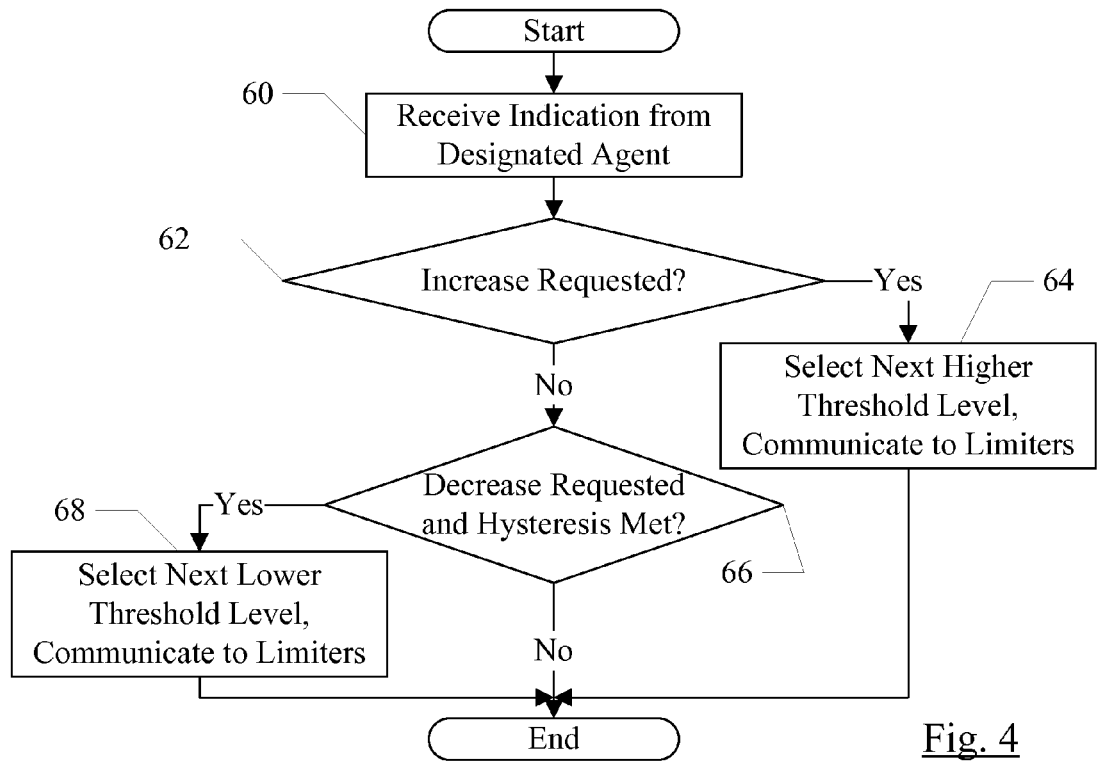
FIG. 4 is a flowchart illustrating operation of another embodiment of the bandwidth management controller shown in FIG. 1.

Turning now to FIG. 4, a flowchart is shown illustrating operation of another embodiment of the bandwidth management controller 18. While the blocks are shown in a particular order for ease of understanding, other orders may be used. Blocks may be performed in parallel by combinatorial logic in the bandwidth management controller 18. Blocks, combinations of blocks, and/or the flowchart as a whole may be pipelined over multiple clock cycles. The bandwidth management controller 18 may be configured to implement the operation shown in FIG. 4.

The embodiment of FIG. 4 may be implemented in addition to the embodiment of FIG. 2 in cases that the bandwidth management controller 18 is configured to accept communications from one or more designated agents 28A-28E indicating whether or not the designated agents are receiving sufficient bandwidth. For example, the designated agents may include real time agents, and the real time agents may be configured to transmit QoS indications with transactions. The real-time QoS indications may include levels of green, yellow, and red indicating increasing levels of urgency. If the QoS indications are yellow or red, the bandwidth management controller 18 may be configured to interpret the indications as indicating that the bandwidth is insufficient. Similarly, if the QoS indications are green, the bandwidth management controller 18 may be configured to interpret the indications as indicating that the bandwidth is sufficient. Out of band signalling may be provided as well, and other agents may be configured to indicate that insufficient bandwidth is being received. Additionally, in some embodiments, the fabric 22 may include circuitry to monitor the bandwidth provided to various agents and, in cases in which the bandwidth is determined to be insufficient for the needs of a given agent, the fabric 22 may adjust the limiters to provide more bandwidth to the given agent.

The bandwidth management controller 18 may be configured to receive an indication from a designated agent (block 60). If the indication indicates a requested increase in bandwidth for the designated agent (decision block 62, "yes" leg), the bandwidth management unit 18 may be configured to select the next higher threshold level (compared to the current threshold level) and may be configured to communicate that next higher threshold level to the limiters 24A-24D except for the limiters that act on the transactions sourced by the designated agent (block 64). If the indication indicates that the bandwidth is sufficient or indicates a decrease, and the hysteresis requirement for the indication is met (e.g. level, or amount of time that the decrease is requested) (decision block 66, "yes" leg), the bandwidth management controller 18 may be configured to select the next lower threshold level and communicate the level to the limiters (block 68). Again, the communication may be to those limiters other than the limiters that affect the designated agent's transactions.

Figures 5, 6:
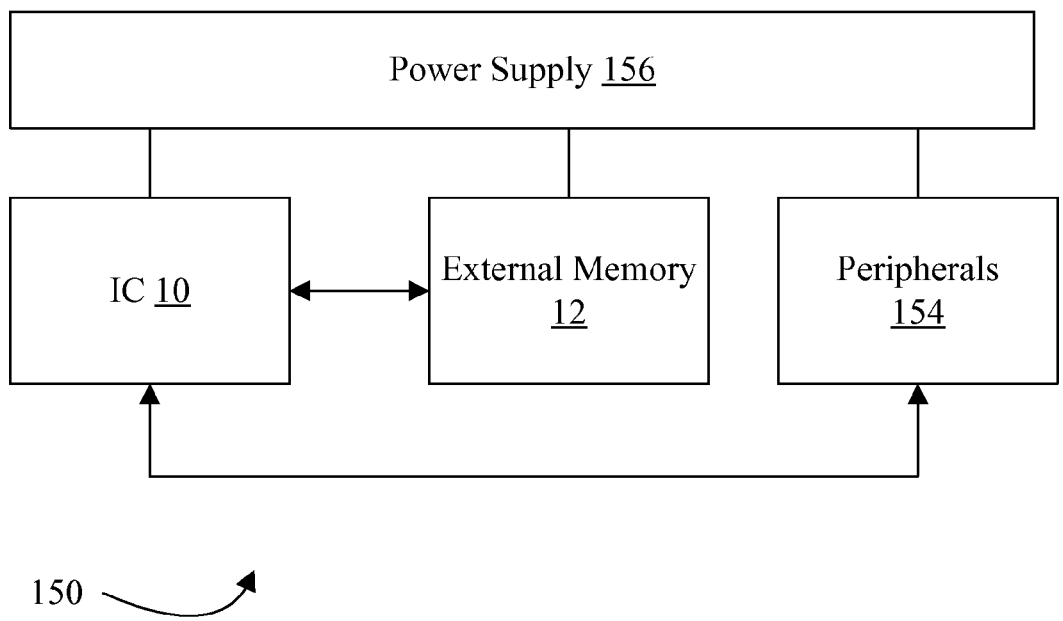
FIG. 5 is a table illustrating an example of bandwidth management for an embodiment.
FIG. 6 is a block diagram of one embodiment of a system including the integrated circuit and the memory shown in FIG. 1.

FIG. 5 is a table illustrating some examples of bandwidth limits that may be imposed at example threshold levels, for an embodiment. The LC tables 26A-26D may be programmed with limits based on the bandwidths in the table of FIG. 5, for example. The bandwidth limits for transactions from a GPU agent are shown, along with processor (CPU) limits and a limit for real time agent. All entries are expressed in Gigabytes/sec.

The GPU bulk transactions (the lowest QoS attribute assigned to GPU transactions) may be 16 GB/s at the lowest threshold level (level 1), but may rapidly decrease at higher levels. On the other hand, the GPU low latency transactions (a higher QoS attribute) may have the same bandwidth limits throughout (although the expected bandwidth is significantly lower). Accordingly, the first two entries in the table of FIG. 5 illustrate an example of using both a transaction source and a transaction attribute to control limits.

Processor bandwidth is not restricted until level 3 is reached, which may reflect the importance of processor memory access to performance. Thus, processor bandwidth is limited differently from the GPU bulk bandwidth, for example. Similarly, real time memory bandwidth is only restricted at the highest level in this example, to avoid erroneous operation that may occur if the real time device does not receive sufficient bandwidth.

It is noted that the table of FIG. 5 is merely a partial example of how bandwidth might be limited for an exemplary embodiment. The number of threshold levels and the relative and absolute bandwidth limits may be varied in other embodiments.

Turning now to FIG. 6, a block diagram of one embodiment of a system 150 is shown. In the illustrated embodiment, the system 150 includes at least one instance of the integrated circuit 10 (from FIG. 1) coupled to one or more peripherals 154 and the external memory 12 (also from FIG. 1). A power supply 156 is provided which supplies the supply voltages to the integrated circuit 10 as well as one or more supply voltages to the memory 12 and/or the peripherals 154. In some embodiments, more than one instance of the integrated circuit 10 may be included (and more than one external memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the integrated circuit 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A system comprising:
a bandwidth management controller configured to monitor transactions received by a resource within the system and to accumulate one or more metrics responsive to the monitoring, wherein the resource is a destination of the transactions in the system, and wherein the bandwidth management controller is configured to indicate that a first metric of the one or more metrics exceeds a first threshold of one or more thresholds, the first threshold corresponding to the first metric;
a plurality of hardware agents configured to transmit transactions to the resource; and
a communication fabric coupled between the plurality of hardware agents and the resource and coupled to the bandwidth management controller, wherein the communication fabric comprises a plurality of limiters configured to limit transaction transmission from the plurality of hardware agents to the resource on the fabric, and wherein the plurality of limiters are configured to dynamically modify one or more limits on the transaction transmission responsive to the indication that the first metric exceeds the first threshold.

2. The system as recited in claim 1 wherein each of the plurality of limiters is coupled to a table having an entry for each of the one or more thresholds, and wherein the plurality of limiters are configured to read the one or more limits from a first entry of the table that corresponds to the first threshold.

3. The system as recited in claim 2 wherein the bandwidth management controller is configured to detect that the first metric exceeds a second threshold of the one or more thresholds, and wherein the plurality of limiters are configured to read the one or more limits from a second entry of the table that corresponds to the second threshold.

4. The system as recited in claim 1 wherein the bandwidth management controller is configured to implement hysteresis between indicating that the first metric has exceeded the first threshold and indicating that the first metric has returned below the first threshold, wherein the bandwidth management controller is configured to dynamically modify the one or more limits back to original settings responsive to the first metric having returned below the first threshold, controlled by the hysteresis.

5. The system as recited in claim 1 wherein the resource is a main memory system.

6. The system as recited in claim 5 wherein the main memory system comprises one or more dynamic random access memory devices.

7. A system comprising:
a memory controller configured to accumulate a plurality of metrics for memory transactions received in the memory controller to access a memory to which the memory controller is coupled during use, wherein the memory controller is configured to compare each metric of the plurality of metrics to a corresponding plurality of thresholds and is configured to communicate that the metric has exceeded a first threshold of the plurality of thresholds;
a plurality of hardware agents configured to generate the memory transactions; and
a communication fabric coupled between the plurality of hardware agents and the memory controller, wherein the communication fabric is configured to dynamically modify one or more fabric characteristics responsive to the communication from the memory controller indicating that the first threshold has been exceeded.

8. The system as recited in claim 7 wherein the plurality of metrics comprise a utilization of the memory.

9. The system as recited in claim 8 wherein the plurality of metrics comprise an average memory latency.

10. The system as recited in claim 7 wherein the communication fabric comprises a plurality of limiters configured to control memory transaction transmission, wherein memory transactions from each of the plurality of hardware agents pass through at least one of the plurality of limiters, and wherein the limits imposed by the plurality of limiters are the fabric characteristics modified responsive to the communication from the memory controller.

11. The system as recited in claim 10 wherein the memory controller is further coupled to receive an indication from a first agent of the plurality of hardware agents that the first agent is receiving insufficient memory bandwidth, and wherein the memory controller is configured to communicate to selected limiters of the plurality of limiters corresponding to other agents of the plurality of hardware agents to modify the limits in the selected limiters responsive to the indication from the first agent.

12. The system as recited in claim 10 wherein each of the plurality of limiters is programmed with a respective limit corresponding to each of the plurality of thresholds, and wherein each of the plurality of limiters is configured to dynamically modify a current limit to the respective limit responsive to the communication from the memory controller indicating that a corresponding threshold of the plurality of thresholds has been exceeded.

13. The system as recited in claim 10 wherein the plurality of limiters comprise transaction limiters configured to limit a number of outstanding transactions.

14. The system as recited in claim 10 wherein the plurality of limiters comprise rate limiters configured to limit a rate at which transactions are transmitted over time.

15. A method comprising:
monitoring memory transactions from a plurality of hardware agents to a memory to determine at least a first performance metric for the memory, the monitoring performed by a memory bandwidth controller for memory transactions received at the memory to access the memory;
determining, by the memory bandwidth controller, that the first performance metric exceeds a first threshold of a plurality of thresholds; and
dynamically reconfiguring a plurality of limiters that limit the memory transactions from the plurality of agents responsive to determining that the first performance metric exceeds the first threshold.

16. The method as recited in claim 15 further comprising:
determining that the first performance metric exceeds a second threshold of the plurality of thresholds; and
dynamically reconfiguring the plurality of limiters responsive to the first performance metric exceeding the second threshold.

17. The method as recited in claim 15 further comprising:
determining that the first performance metric no longer exceeds the first threshold; and
dynamically reconfiguring the plurality of limiters responsive to the first performance metric no longer exceeding the first threshold.

18. The method as recited in claim 17 wherein the determining that the first performance metric no longer exceeds the first threshold is performed using hysteresis.

19. The method as recited in claim 15 further comprising programming the plurality of limiters with limits corresponding to each of the plurality of thresholds.

20. The method as recited in claim 15 further comprising programming a bandwidth management controller with the plurality of thresholds.

* * * * *